(12) United States Patent
Lu

(10) Patent No.: US 11,201,481 B2
(45) Date of Patent: Dec. 14, 2021

(54) MAGNETIC ATTRACTING TYPE VEHICLE-MOUNTED WIRELESS CHARGING DEVICE

(71) Applicant: Dongguan Kington Electric Technology Co. Ltd., Dongguan (CN)

(72) Inventor: Menghai Lu, Shenzhen (CN)

(73) Assignee: Dongguan Kington Electric Technology Co. Ltd., Dongguan (CN)

( * ) Notice: Subject to any disclaimer, the term of this patent is extended or adjusted under 35 U.S.C. 154(b) by 173 days.

(21) Appl. No.: 16/457,286

(22) Filed: Jun. 28, 2019

(65) Prior Publication Data

US 2020/0006966 A1 Jan. 2, 2020

(30) Foreign Application Priority Data

Jun. 28, 2018 (CN) .......................... 201821012530.8

(51) Int. Cl.
*H02J 7/00* (2006.01)
*H02J 7/02* (2016.01)
(52) U.S. Cl.
CPC ............ *H02J 7/0042* (2013.01); *H02J 7/025* (2013.01)
(58) Field of Classification Search
CPC .............................. H02J 7/0042; H02J 7/025
USPC ........................................................ 320/108
See application file for complete search history.

(56) References Cited

U.S. PATENT DOCUMENTS

| | | | |
|---|---|---|---|
| 2014/0265555 A1* | 9/2014 | Hall ...................... | B60L 3/0046 307/9.1 |
| 2015/0002088 A1* | 1/2015 | D'Agostino .......... | H02J 7/0044 320/108 |
| 2016/0087485 A1* | 3/2016 | Maeda .................... | H02J 7/025 455/573 |
| 2016/0276865 A1* | 9/2016 | Pike ........................ | H02J 50/70 |
| 2020/0062191 A1* | 2/2020 | Ragner ................... | B60R 11/02 |
| 2020/0161897 A1* | 5/2020 | Dudar .................. | H04B 5/0037 |

* cited by examiner

*Primary Examiner* — Suchin Parihar
(74) *Attorney, Agent, or Firm* — Bayramoglu Law Offices LLC

(57) ABSTRACT

A magnetic attracting type vehicle-mounted wireless charging device comprises a wireless charger, and a magnetic attracting device which is attachable to a rear surface of mobile electronic equipment, wherein the wireless charger comprises a wireless charger housing, a transmitting coil arranged in the wireless charger housing, shielding magnets which are circumferentially arranged around the transmitting coil, and a printed circuit board (PCB) which is electrically connected to the transmitting coil; the shielding magnets comprise magnets, and shielding covers which cover the outer surfaces of the magnets; openings as large as the top surfaces of the magnets are formed in the shielding covers, and the top parts of the magnets are exposed from the shielding covers through the openings; the magnetic attracting device is subjected to magnetic attracting to the top parts of the magnets.

6 Claims, 2 Drawing Sheets

MAGNETIC ATTRACTING TYPE VEHICLE-MOUNTED WIRELESS CHARGING DEVICE

CROSS-REFERENCE TO RELATED APPLICATION(S)

This application claims priority to Chinese Patent Application No. 201821012530.8, filed on Jun. 28, 2018, which published as CN208285078U on Dec. 25, 2018, the content of which is incorporated herein by reference.

TECHNICAL FIELD

The application relates to the technical field of vehicle-mounted wireless charging, and specifically relates to a magnetic attracting type vehicle-mounted wireless charging device.

SUMMARY

This application provides a magnetic attracting type vehicle-mounted wireless charging device aimed to solve the abovementioned problems. The magnetic attracting type vehicle-mounted wireless charging device is capable of firmly fixing a mobile electronic device and reducing the interference of magnets built in a wireless charger to a transmitting coil, and thus the heating loss is decreased, and the wireless charging efficiency is improved.

To achieve the abovementioned purposes, embodiments of the disclosure are implemented by the technical schemes as follows:

A magnetic attracting type vehicle-mounted wireless charging device comprises a wireless charger, and a magnetic attracting device which is attached to the rear surface of a mobile electronic device, wherein the wireless charger comprises a wireless charger housing, a transmitting coil arranged in the wireless charger housing, shielding magnets which are circumferentially arranged around the transmitting coil, and a printed circuit board (PCB) which is electrically connected to the transmitting coil; the shielding magnets comprise magnets, and shielding covers which cover the outer surfaces of the magnets; openings as large as the top surfaces of the magnets are formed in the shielding covers, and the top parts of the magnets are exposed from the shielding covers through the openings; the magnetic attracting device is subjected to magnetic attracting to the top parts of the magnets.

In one embodiment, the magnetic attracting device is a soft rubber magnetic attracting sheet or a magnetic guide steel sheet.

In one embodiment, the soft rubber magnetic attracting sheet comprises a soft rubber sheet, magnetic steel sheets which are built in clamping slots surrounding the soft rubber sheet, and gummed paper attached to the surface of the soft rubber sheet and the surfaces of the magnetic steel sheets; the surface of the soft rubber sheet and the surfaces of the magnetic steel sheets are on the same horizontal plane.

In one embodiment, the magnetic guide steel sheet comprises a steel sheet, and gummed paper attached to the surface of the steel sheet.

In one embodiment, the wireless charger housing comprises an upper cover of the wireless charger and a lower cover of the wireless charger; the upper cover of the wireless charger is connected to the lower cover of the wireless charger in a clamping buckling manner.

In one embodiment, shielding magnet clamping slots for fixing the shielding magnets are formed in the wireless charger housing.

In one embodiment, the shielding cover is manufactured through a thin metal sheet.

Embodiments of the disclosure work on the basis of the principle as follows: wireless charging is implemented through the magnetic induction technology; the shielding magnets covered with metal covers are built in the wireless charger, and only the top surfaces of the shielding magnets are exposed; the soft rubber magnetic attracting sheet or the magnetic guide steel sheet is attached to the rear surface of the mobile electronic device and is subjected to magnetic attracting with the top surfaces of the shielding magnets, and thus the mobile electronic device can be firmly fixed to the wireless charger.

This disclosure has the beneficial effects as follows:

This disclosure realizes wireless charging through the magnetic induction technology; the shielding magnets are built in the wireless charger; the soft rubber magnetic attracting sheet or the magnetic guide steel sheet is attached to the rear surface of the mobile electronic device and is subjected to magnetic attracting with the shielding magnets in order to firmly fix the mobile electronic device to the wireless charger for charging. Therefore, the charging continuity of the mobile electronic device is ensured. The shielding magnets built in the wireless charger are manufactured through magnets covered with the metal covers, and the metal covers perform shielding to decrease the interference of the magnets to the magnetic field of the transmitting coil, thus the heating loss of the wireless charger in charging is decreased, and the wireless charging efficiency is improved.

DETAILED DESCRIPTION

Figure 1:
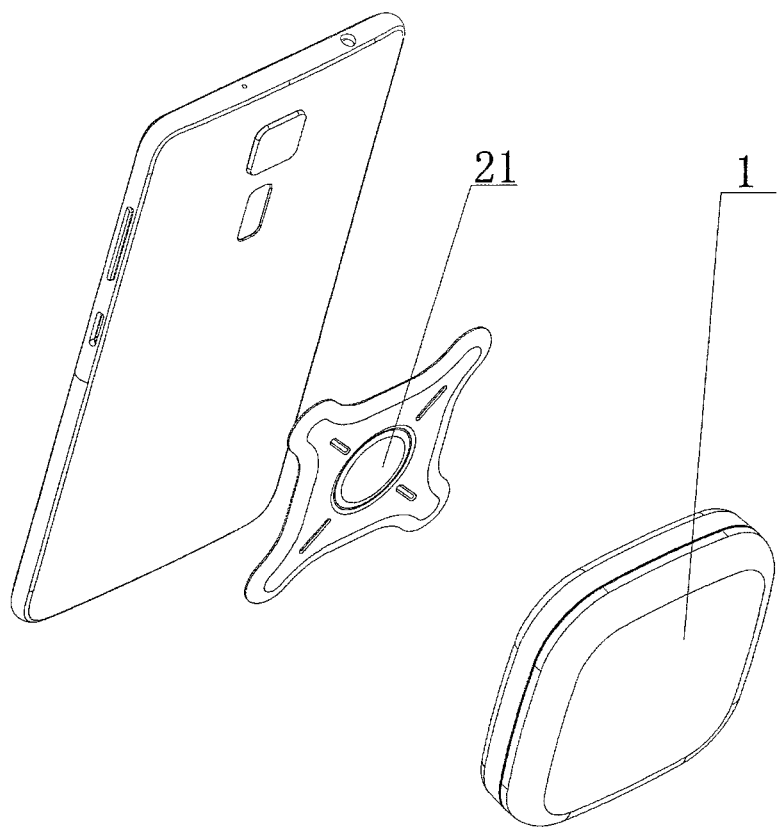
FIG. 1 is a structure diagram of the magnetic attracting type vehicle-mounted wireless charging device in accordance with one embodiment.

As mobile electronic devices like mobile phones and laptops increase, so do the demands for electricity. To meet the demand for charging the mobile electronic device anytime, anywhere, a wireless charger utilizing a magnetic induction technology came on the market, and the wireless charger utilizing the magnetic induction technology can only be charged after being in contact with the mobile electronic device. In case that the wireless charger is used in an automobile environment or other similar unstable placing planes, the mobile electronic devices are to be fixed to the wireless charger.

The mobile electronic devices are generally fixed to the magnetic charger in a magnetic attracting manner. When the wireless charger is in actual use, a transmitting coil generates a magnetic field, and magnetic fields of magnets built in the wireless charger interfere the magnetic field of the transmitting coil, and as a result, the heating loss is caused, the wireless charging efficiency is decreased, and meanwhile, the magnetic fields of the magnets are influenced and the magnetic attracting strength is reduced, which influences the fixing strength of the mobile electronic device.

The embodiments of the disclosure are explained in detail below with reference to accompanying drawings.

Referring to FIGS. 1-4, a magnetic attracting type vehicle-mounted wireless charging device comprises a wireless charger 1 and a magnetic attracting device 2 which is attached to the rear surface of a mobile electronic device; the wireless charger 1 comprises a wireless charger housing 10, a transmitting coil 11 arranged in the wireless charger housing 10, shielding magnets 12 which are circumferentially arranged around the transmitting coil 11, and a PCB 13 which is electrically connected to the transmitting coil; the shielding magnets 12 comprise magnets 121, and shielding covers 122 which are manufactured through thin metal sheets and cover the outer surfaces of the magnets 121; openings as large as the top surfaces of the magnets are formed in the shielding covers 122, and the top parts of the magnets are exposed from the shielding covers 122 through the openings; and the magnetic attracting device 2 is subjected to magnetic attracting with the top parts of the magnets. The mobile electronic devices in the abovementioned structure include but are not limit to mobile phones and laptops. In case of a mobile phone, the magnetic attracting device 2 attached to the back of the mobile phone is subjected to magnetic attracting with the shielding magnets built in the wireless charger in order to fix the mobile phone, and thus the mobile phone can be continuously charged.

The embodiment does not limit the shape of the magnets 121 in the abovementioned structure, namely, the magnets 121 can be cuboid-shaped, or cubic or cylindrical. The magnets 121 are completely covered with the shielding covers 122, excepting one surface which can be subjected to magnetic attracting with the magnetic attracting device 2 attached at the back of the mobile phone to fix the mobile phone. The surfaces, covered with the thin metal sheets, of the magnets nearly do not influence the magnetic fields of the transmitting coil, and such influence is almost negligible. Therefore, the influence of the magnets on the magnetic field of the transmitting coil can be effectively reduced, and as a result, the heating loss of the wireless charger in charging can be decreased, and the wireless charging efficiency is improved.

In the embodiment, the magnetic attracting device 2 is a soft rubber magnetic attracting sheet 21; the soft rubber magnetic attracting sheet 21 comprises a soft rubber sheet 211, magnetic steel sheets 212 which are built in clamping slots surrounding the soft rubber sheet 211, and 3M gummed paper 213 attached to the surface of the soft rubber sheet 211 and the surfaces of the magnetic steel sheets 212; the surface of the soft rubber sheet and the surfaces of the magnetic steel sheets are on the same horizontal plane.

Figure 2:
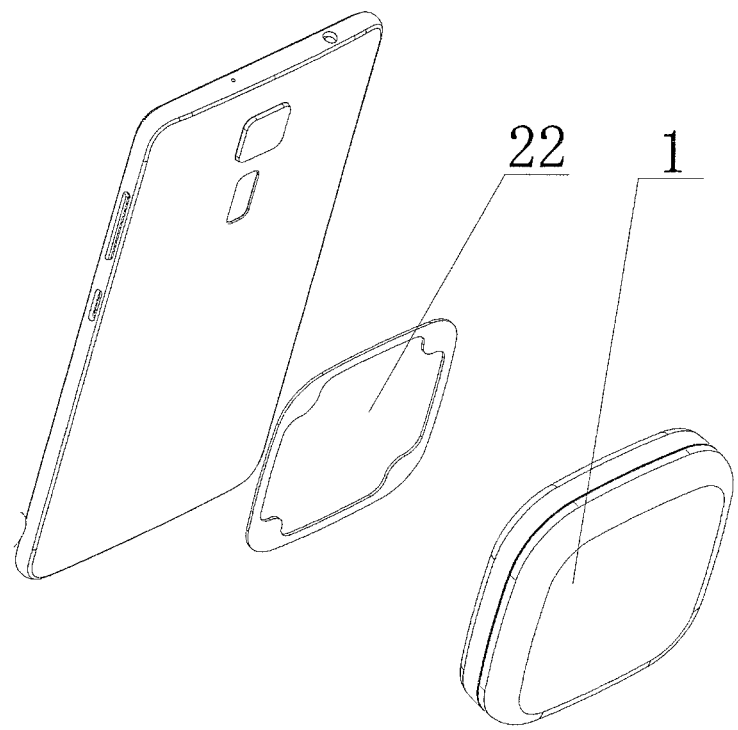
FIG. 2 is another structure diagram of the magnetic attracting type vehicle-mounted wireless charging device in accordance with one embodiment.
Figure 3:
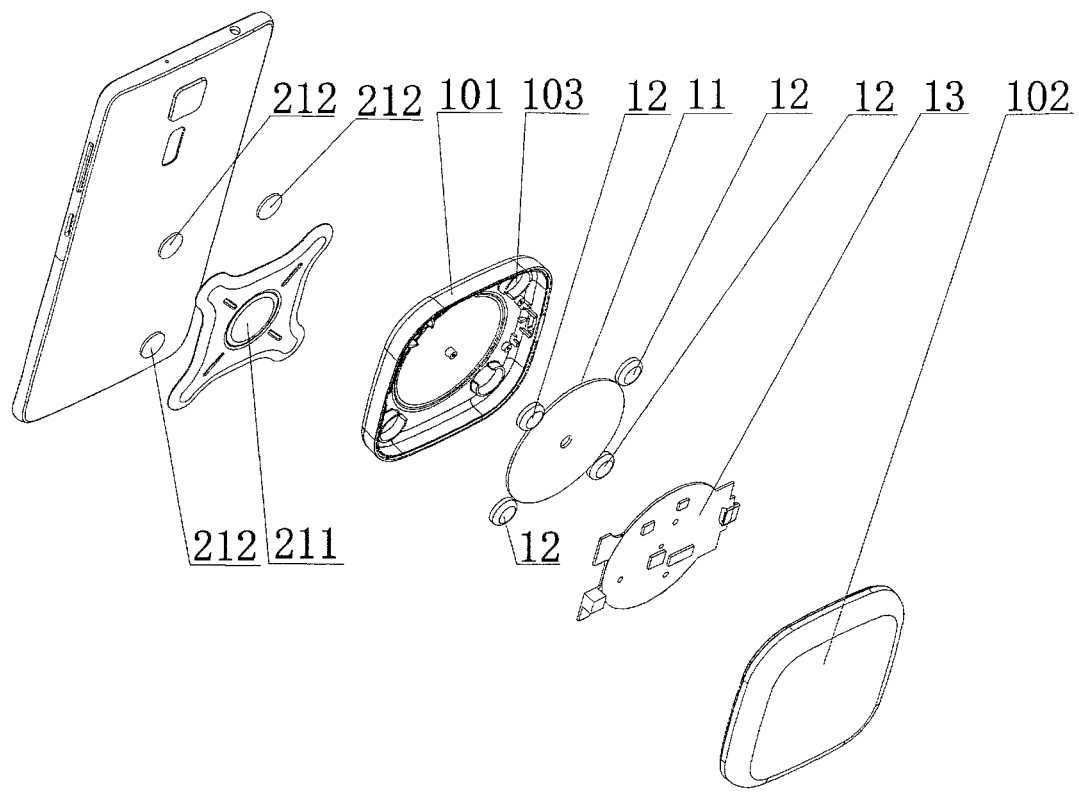
FIG. 3 is an exploded view of the magnetic attracting type vehicle-mounted wireless charging device in accordance with one embodiment.
Figure 4:
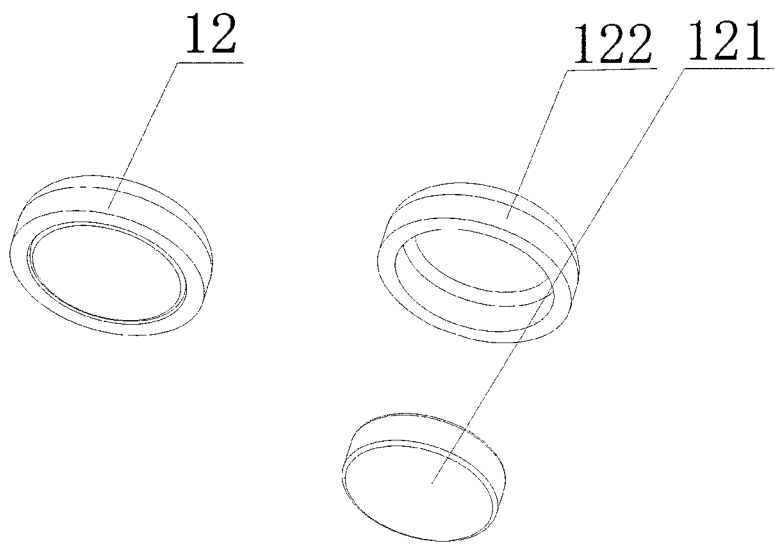
FIG. 4 is a structure diagram of the shielding magnets in accordance with one embodiment.

FIG. 2 shows that the magnetic attracting device 2 is a magnetic guide steel sheet 22 which comprises a steel sheet 221 and 3M gummed paper 222 that is attached to the surface of the steel sheet.

The embodiment shows that the wireless charger housing 10 comprises an upper cover 101 of the wireless charger and a lower cover 102 of the wireless charger; the upper cover 101 of the wireless charger is connected to the lower cover 102 of the wireless charger in a clamping buckling manner; the upper cover of the wireless charger and the lower cover of the wireless charger form the wireless charger housing which facilitates the dismounting, repairing or examining of the wireless charger.

The embodiment shows that shielding magnet clamping slots 103 for fixing the shielding magnets 12 are formed in the wireless charger housing 10; the shielding magnets 12 can be fixed into the wireless charger housing through the shielding magnet clamping slots 103, and thus the positions of the shielding magnets cannot change as the service environment changes, and the soft rubber magnetic attracting sheet or the magnetic guide steel sheet on the mobile phone can be subjected to magnetic attracting to the shielding magnets anytime, and the wireless charging continuity of the mobile phone is ensured.

The application works on the basis of the principle as follows: wireless charging is implemented through the magnetic induction technology; the shielding magnets wrapped with the metal covers are built in the wireless charger, and the top surfaces of the shielding magnets are exposed; the soft rubber magnetic attracting sheet or the magnetic guide steel sheet is attached to the rear surface of the mobile electronic device and is subjected to magnetic attracting with the top surfaces of the shielding magnets, and thus the mobile electronic device can be firmly fixed to the wireless charger.

This application has the beneficial effects as follows:

This application realizes wireless charging through the magnetic induction technology; the shielding magnets are built in the wireless charger; the soft rubber magnetic attracting sheet or the magnetic guide steel sheet is attached to the rear surface of the mobile electronic device and is subjected to magnetic attracting with the shielding magnets in order to firmly fix the mobile electronic device to the wireless charger for charging. Therefore, the charging continuity of the mobile electronic device is ensured. The shielding magnets built in the wireless charger are manufactured through magnets covered with metal covers, and the metal covers perform shielding to decrease the interference of the magnets to the magnetic field of the transmitting coil, thus the heating loss of the wireless charger in charging is decreased, and the wireless charging efficiency is improved.

The foregoing descriptions of the embodiments are the example embodiments of this application and are not to limit this application. It is intended that all substitutions to same objects and modifications made on the basis of the information recorded in the claims and the description of this utility model are included in the scope of the claims of this application. Additionally, the abstract and the title are used only for supporting the search for patent documents, rather than limiting the scope of the right of this application.

What is claimed is:

1. A magnetic attracting type vehicle-mounted wireless charging device comprising:
   a wireless charger; and
   a magnetic attracting device, configured to be attached to an outer rear surface of a mobile electronic device;
   wherein the wireless charger comprises a wireless charger housing, a transmitting coil arranged in the wireless charger housing, a plurality of shielding magnets circumferentially arranged around the transmitting coil, and a printed circuit board (PCB) electrically connected to the transmitting coil; wherein the plurality of shielding magnets each comprise a magnet, and a shielding cover completely covering an outer surface of the magnet, except that an opening as large as a top surface of the magnet is defined in the shielding cover, and a top part of the magnet is exposed from the shielding cover through the opening; wherein the magnetic attracting device is subjected to magnetic attracting to the top part of the magnet;

wherein the magnetic attracting device is a soft rubber magnetic attracting sheet or a magnetic guide steel sheet.

2. The magnetic attracting type vehicle-mounted wireless charging device of claim 1, wherein the soft rubber magnetic attracting sheet comprises a soft rubber sheet, a plurality of magnetic steel sheets built in clamping slots surrounding the soft rubber sheet, and gummed paper sheets attached to a surface of the soft rubber sheet and surfaces of the magnetic steel sheets; wherein the surface of the soft rubber sheet and the surfaces of the magnetic steel sheets are located on a same horizontal plane.

3. The magnetic attracting type vehicle-mounted wireless charging device of claim 1, wherein the magnetic guide steel sheet comprises a steel sheet, and a gummed paper sheet attached to the surface of the steel sheet.

4. The magnetic attracting type vehicle-mounted wireless charging device of claim 1, wherein the wireless charger housing comprises an upper cover and a lower cover, wherein the upper cover is connected to the lower cover in a clamping buckling manner.

5. The magnetic attracting type vehicle-mounted wireless charging device of claim 4, wherein a plurality of shielding magnet clamping slots for fixing the shielding magnets are defined in the wireless charger housing.

6. The magnetic attracting type vehicle-mounted wireless charging device of claim 1, wherein the shielding cover is manufactured through a thin metal sheet.

* * * * *